(12) United States Patent
Wang

(10) Patent No.: US 11,184,770 B2
(45) Date of Patent: Nov. 23, 2021

(54) WIRELESS NETWORK ACCESS CONTROL METHOD, DEVICE, AND SYSTEM

(71) Applicant: HUAWEI TECHNOLOGIES CO., LTD., Guangdong (CN)

(72) Inventor: Jun Wang, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 14 days.

(21) Appl. No.: 16/601,130

(22) Filed: Oct. 14, 2019

(65) Prior Publication Data
US 2020/0045620 A1 Feb. 6, 2020

Related U.S. Application Data

(63) Continuation of application No. 15/505,572, filed as application No. PCT/CN2014/084926 on Aug. 21, 2014, now Pat. No. 10,448,317.

(51) Int. Cl.
| | |
|---|---|
| *H04W 12/08* | (2021.01) |
| *H04W 48/02* | (2009.01) |
| *H04W 48/08* | (2009.01) |
| *H04L 29/06* | (2006.01) |
| *H04W 48/14* | (2009.01) |

(52) U.S. Cl.
CPC ........ *H04W 12/08* (2013.01); *H04L 63/083* (2013.01); *H04W 48/02* (2013.01); *H04W 48/08* (2013.01); *H04W 48/14* (2013.01)

(58) Field of Classification Search
CPC ..... H04W 12/08; H04W 48/08; H04W 48/14; H04W 48/02; H04L 63/083
See application file for complete search history.

(56) References Cited

U.S. PATENT DOCUMENTS

| | | | |
|---|---|---|---|
| 7,539,156 B2 * | 5/2009 | Leung | H04W 92/18 370/313 |
| 7,958,211 B2 | 6/2011 | Lam et al. | |
| 9,015,789 B2 | 4/2015 | Thomas | |
| 9,154,475 B1 | 10/2015 | Kailash et al. | |
| 9,826,397 B2 * | 11/2017 | Zhou | H04W 12/08 |
| 9,974,091 B2 | 5/2018 | Rubin et al. | |
| 2004/0167984 A1 | 8/2004 | Herrmann | |

(Continued)

FOREIGN PATENT DOCUMENTS

| | | |
|---|---|---|
| CN | 101489279 A | 7/2009 |
| CN | 102484837 A | 5/2012 |

(Continued)

*Primary Examiner* — Matthew Smithers
(74) *Attorney, Agent, or Firm* — HUAWEI TECHNOLOGIES CO., LTD.

(57) ABSTRACT

Embodiments of the present invention disclose a wireless network access control method, device, and computer readable medium. The method includes: receiving via a mobile network an access request sent by a user device for requesting Internet access by using a wireless network of a wireless access device after a sharing status of the wireless network is set to be enabled by a setting device; and performing control processing to allow the user device to access the Internet by using the wireless network, such that the wireless access device processes Internet data related to the user device via the wireless network after the user device accesses the Internet by using the wireless network.

14 Claims, 3 Drawing Sheets

(56) References Cited

U.S. PATENT DOCUMENTS

| | | |
|---|---|---|
| 2007/0070935 A1 | 3/2007 | Prakash et al. |
| 2007/0186105 A1 | 8/2007 | Bailey et al. |
| 2007/0237114 A1* | 10/2007 | Mehta ............... H04W 36/12 370/331 |
| 2009/0305671 A1* | 12/2009 | Luft ............... H04W 12/08 455/411 |
| 2010/0014495 A1 | 1/2010 | Hirano |
| 2010/0242082 A1 | 9/2010 | Keene et al. |
| 2011/0047603 A1 | 2/2011 | Gordon et al. |
| 2012/0036557 A1 | 2/2012 | Li |
| 2013/0128875 A1 | 5/2013 | Kubota et al. |
| 2013/0200993 A1 | 8/2013 | Wu et al. |
| 2013/0217364 A1 | 8/2013 | Varoglu et al. |
| 2013/0303157 A1 | 11/2013 | Tao |
| 2014/0092731 A1 | 4/2014 | Gupta |
| 2014/0155120 A1 | 6/2014 | Karmanenko et al. |
| 2014/0213256 A1* | 7/2014 | Meylan ............... H04W 48/18 455/436 |
| 2014/0274021 A1 | 9/2014 | Jang et al. |
| 2015/0257040 A1 | 9/2015 | Moore, Jr. et al. |
| 2017/0201852 A1 | 7/2017 | Kuang et al. |

FOREIGN PATENT DOCUMENTS

| | | |
|---|---|---|
| CN | 102572832 A | 7/2012 |
| CN | 102802232 A | 11/2012 |
| CN | 103139848 A | 6/2013 |
| CN | 103369527 A | 10/2013 |
| CN | 103841625 A | 6/2014 |
| CN | 103873449 A | 6/2014 |
| CN | 103974257 A | 8/2014 |
| EP | 2437551 A1 | 4/2012 |
| EP | 2753108 A2 | 7/2014 |
| EP | 2779723 B1 | 2/2018 |
| JP | 2009510947 A | 3/2009 |
| JP | 2012134703 A | 7/2012 |
| JP | 2013198130 A | 9/2013 |
| JP | 2014057358 A | 3/2014 |
| WO | 2004029823 A1 | 4/2004 |
| WO | 2008020536 A1 | 2/2008 |
| WO | 2008030525 A2 | 3/2008 |
| WO | 2011147334 A1 | 12/2011 |
| WO | 2012126634 A1 | 9/2012 |
| WO | 2013160525 A1 | 10/2013 |
| WO | 2014043494 A1 | 3/2014 |
| WO | 2014089069 A1 | 6/2014 |

* cited by examiner

WIRELESS NETWORK ACCESS CONTROL METHOD, DEVICE, AND SYSTEM

CROSS-REFERENCE TO RELATED APPLICATIONS

This application is a continuation of U.S. patent application Ser. No. 15/505,572, filed on Feb. 21, 2017, which is a National Stage of International Application No. PCT/CN2014/084926, filed on Aug. 21, 2014, both of which are hereby incorporated by reference in their entireties.

TECHNICAL FIELD

Embodiments of the present invention relate to the field of communications technologies, and in particular, to a wireless network access control method, device, and system.

BACKGROUND

With development of the mobile Internet, wireless access devices such as a wireless router and a home gateway are increasingly popular in enterprises and families. Therefore, increasingly wide mobile Internet coverage is provided, so that a user can conveniently access the mobile Internet by using a wireless network device.

Wireless access and over-the-air transfer are used in the mobile Internet. Therefore, when user device searches for a nearby wireless network, if no access password is set for the wireless network, the user device may access the wireless network. If knowing an access password of the wireless network, the user device may access the wireless network by using the access password. If not knowing an access password of the wireless network, the user device may crack the access password of the wireless network by using password cracking software, so as to access the wireless network. Therefore, in a specific case, a large quantity of user device may access a wireless network, and this may cause a difficulty in accessing the wireless network or affect network service quality of the wireless network.

To improve network service quality of a wireless network, an owner of the wireless network may also perform security protection on an access password, so that other user device cannot access the wireless network. In this case, when the owner of the wireless network does not use the wireless network, because other user device cannot access the wireless network, a waste of wireless network resources is caused.

It may be learned that in an existing wireless network access control technology, a method that can flexibly control wireless network access is lacking, where the method not only avoids a waste of wireless network resources, but also does not affect wireless network access quality.

SUMMARY

The present invention provides a wireless network access control method, device, and system, so that wireless network access can be controlled flexibly. This not only avoids a waste of wireless network resources, but also does not affect wireless network access quality.

According to a first aspect, an embodiment of the present invention provides a wireless network access control method, including:

receiving, by a control device, a wireless network access request message sent by user device, where the wireless network access request message includes an identifier of at least one wireless network;

obtaining, by the control device, a preset access condition parameter corresponding to the identifier of the wireless network; and sending, by the control device, the identifier and an access password that are of the wireless network to the user device when determining, according to the preset access condition parameter, that a current access condition parameter of the wireless network meets the preset access condition parameter, so that the user device accesses the wireless network according to the identifier and the access password that are of the wireless network, where the current access condition parameter is a current access condition parameter of the wireless network that is obtained by the control device.

In a first possible implementation manner of the first aspect, before the obtaining, by the control device, a preset access condition parameter corresponding to the identifier of the wireless network, the method further includes:

receiving, by the control device, the preset access condition parameter of the wireless network that is sent by a setting device; and saving, by the control device, the preset access condition parameter of the wireless network in a control policy parameter list corresponding to the identifier of the wireless network.

In a second possible implementation manner of the first aspect, with reference to the first possible implementation manner of the first aspect, the obtaining, by the control device, a preset access condition parameter corresponding to the identifier of the wireless network includes:

querying, by the control device according to the identifier of the wireless network in the wireless network access request message, the control policy parameter list corresponding to the identifier of the wireless network, to obtain the preset access condition parameter corresponding to the identifier of the wireless network.

In a third possible implementation manner of the first aspect, with reference to the first aspect, the first possible implementation manner of the first aspect, or the second possible implementation manner of the first aspect, after the sending, by the control device, the identifier and an access password that are of the wireless network to the user device when determining, according to the preset access condition parameter, that a current access condition parameter of the wireless network meets the preset access condition parameter, so that the user device accesses the wireless network according to the identifier and the access password that are of the wireless network, the method further includes:

receiving, by the control device, status parameter duration of access to the wireless network that is sent by the user device; and sending, by the control device, a disconnection request message to an access device of the wireless network when determining that the status parameter does not meet the preset access condition parameter of the wireless network, where the disconnection request message includes an identifier of the user device, so that the access device disconnects the user device from the wireless network according to the identifier of the user device in the disconnection request message.

In a fourth possible implementation manner of the first aspect, with reference to the first aspect, the first possible implementation manner of the first aspect, the second possible implementation manner of the first aspect, or the third possible implementation manner of the first aspect, the preset access condition parameter includes at least one of the following parameters: an identifier of user device allowed to access the wireless network, a largest quantity of user device allowed to access the wireless network, longest duration allowed for access to the wireless network, or traffic or bandwidth allowed for access to the wireless network.

According to a second aspect, an embodiment of the present invention provides a wireless network access control device, including:

a receiving unit, configured to receive a wireless network access request message sent by user device, where the wireless network access request message includes an identifier of at least one wireless network;

a processing unit, configured to obtain a preset access condition parameter corresponding to the identifier of the wireless network; where the processing unit is further configured to: when determining, according to the preset access condition parameter, that a current access condition parameter of the wireless network meets the preset access condition parameter, instruct a sending unit to send the identifier and an access password that are of the wireless network to the user device; and the sending unit, configured to send the identifier and the access password that are of the wireless network to the user device, so that the user device accesses the wireless network according to the identifier and the access password that are of the wireless network, where the current access condition parameter is a current access condition parameter of the wireless network that is obtained by the control device.

In a first possible implementation manner of the second aspect, the receiving unit is further configured to:

receive the preset access condition parameter of the wireless network that is sent by a setting device; and the device further includes:

a savage unit, configured to save the preset access condition parameter of the wireless network in a control policy parameter list corresponding to the identifier of the wireless network.

In a second possible implementation manner of the second aspect, with reference to the first possible implementation manner of the second aspect, the processing unit is specifically configured to query, according to the identifier of the wireless network in the wireless network access request message, the control policy parameter list corresponding to the identifier of the wireless network, to obtain the preset access condition parameter corresponding to the identifier of the wireless network.

In a third possible implementation manner of the second aspect, with reference to the second aspect, the first possible implementation manner of the second aspect, or the second possible implementation manner of the second aspect, the receiving unit is further configured to:

receive status parameter duration of access to the wireless network that is sent by the user device;

the processing unit is further configured to: when determining that the status parameter does not meet the preset access condition parameter of the wireless network, instruct the sending unit to send a disconnection request to an access device of the wireless network; and the sending unit is further configured to send the disconnection request message to the access device of the wireless network, where the disconnection request message includes an identifier of the user device, so that the access device disconnects the user device from the wireless network according to the identifier of the user device in the disconnection request message.

According to a third aspect, an embodiment of the present invention provides a wireless network access control system, and the system includes a control device and user device; where the control device includes the wireless network access control device described in the second aspect and any one of the possible implementation manners of the second aspect;

the user device is configured to send a wireless network access request message to the control device, where the wireless network access request message includes an identifier of at least one wireless network, so that the control device obtains a preset access condition parameter corresponding to the identifier of the wireless network, and sends the identifier and an access password that are of the wireless network to the user device when determining that a current access condition parameter of the wireless network meets the preset access condition parameter, where the current access condition parameter is a current access condition parameter of the wireless network that is obtained by the control device; and the user device is further configured to access the wireless network according to the identifier and the access password that are of the wireless network.

In a first possible implementation manner of the third aspect, the system further includes:

a setting device, configured to set the preset access condition parameter of the wireless network; where the setting device is further configured to send the preset access condition parameter of the wireless network to an access device of the wireless network, so that the access device saves the preset access condition parameter; and the setting device is further configured to send the preset access condition parameter of the wireless network to the control device, so that the control device saves the preset access condition parameter of the wireless network in a control policy parameter list corresponding to the identifier of the wireless network.

In a second possible implementation manner of the third aspect, with reference to the third aspect or the first possible implementation manner of the third aspect, the user device is further configured to send, to the control device, a status parameter of connection to the wireless network by the user device, so that the control device sends a disconnection request message to the access device of the wireless network when determining that the status parameter does not meet the preset access condition parameter of the wireless network, where the disconnection request message includes an identifier of the user device; and the access device is further configured to disconnect the user device from the wireless network according to the identifier of the user device in the disconnection request message.

In a third possible implementation manner of the third aspect, with reference to the third aspect, the first possible implementation manner of the third aspect, or the second possible implementation manner of the third aspect, the preset access condition parameter includes at least one of the following parameters: an identifier of user device allowed to access the wireless network, a largest quantity of user device allowed to access the wireless network, longest duration allowed for access to the wireless network, or traffic or bandwidth allowed for access to the wireless network.

According to a fourth aspect, an embodiment of the present invention provides a wireless network access control device, including a receiver, a transmitter, and a processor, where the receiver, the transmitter, and the processor are connected to each other by using a bus; where the receiver is configured to receive a wireless network access request message sent by user device, where the wireless network access request message includes an identifier of at least one wireless network;

the processor is configured to: obtain a preset access condition parameter corresponding to the identifier of the wireless network, and when determining, according to the preset access condition parameter, that a current access condition parameter of the wireless network meets the preset access condition parameter, instruct the transmitter to send the identifier and an access password that are of the wireless network to the user device; and the transmitter is configured to send the identifier and the access password that are of the wireless network to the user device, so that the user device accesses the wireless network according to the identifier and the access password that are of the wireless network, where the current access condition parameter is a current access condition parameter of the wireless network that is obtained by the control device.

In a first possible implementation manner of the fourth aspect, the receiver is further configured to receive the preset access condition parameter of the wireless network that is sent by a setting device; and the processor is further configured to save the preset access condition parameter of the wireless network in a control policy parameter list corresponding to the identifier of the wireless network.

In a second possible implementation manner of the fourth aspect, with reference to the first possible implementation manner of the fourth aspect, the processor is specifically configured to query, according to the identifier of the wireless network in the wireless network access request message, the control policy parameter list corresponding to the identifier of the wireless network, to obtain the preset access condition parameter corresponding to the identifier of the wireless network.

In a third possible implementation manner of the fourth aspect, with reference to the fourth aspect, the first possible implementation manner of the fourth aspect, or the second possible implementation manner of the fourth aspect, the receiver is further configured to receive status parameter duration of access to the wireless network that is sent by the user device;

the processor is further configured to: when determining that the status parameter does not meet the preset access condition parameter of the wireless network, instruct the sending unit to send a disconnection request to an access device of the wireless network; and the transmitter is further configured to send the disconnection request message to the access device of the wireless network, where the disconnection request message includes an identifier of the user device, so that the access device disconnects the user device from the wireless network according to the identifier of the user device in the disconnection request message.

According to the wireless network access control method, device, and system provided in the embodiments of the present invention, a control device receives a wireless network access request message that is sent by user device and that carries an identifier of at least one wireless network, and determines, according to the identifier of the wireless network, a control policy parameter corresponding to the identifier of the wireless network. Because the control policy parameter includes a preset access condition parameter, the control device sends the control policy parameter of the wireless network to the user device when determining that a current access condition parameter of the wireless network to be accessed by the user device meets the preset access condition parameter, so that the user device accesses the wireless network according to the control policy parameter, and wireless network access can be controlled flexibly. This not only avoids a waste of wireless network resources, but also does not affect wireless network access quality.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The technical solutions of the present invention may be applied to various wireless communications systems, such as a Global System for Mobile Communications (Global System for Mobile Communications, GSM for short), a general packet radio service (General Packet Radio Service, GPRS for short) system, a Code Division Multiple Access (Code Division Multiple Access, CDMA for short) system, a CDMA2000 system, a Wideband Code Division Multiple Access (Wideband Code Division Multiple Access, WCDMA for short) system, a Long Term Evolution (Long Term Evolution, LTE for short) system, or a Worldwide Interoperability for Microwave Access (World Interoperability for Microwave Access, WiMAX for short) system.

Figure 1:
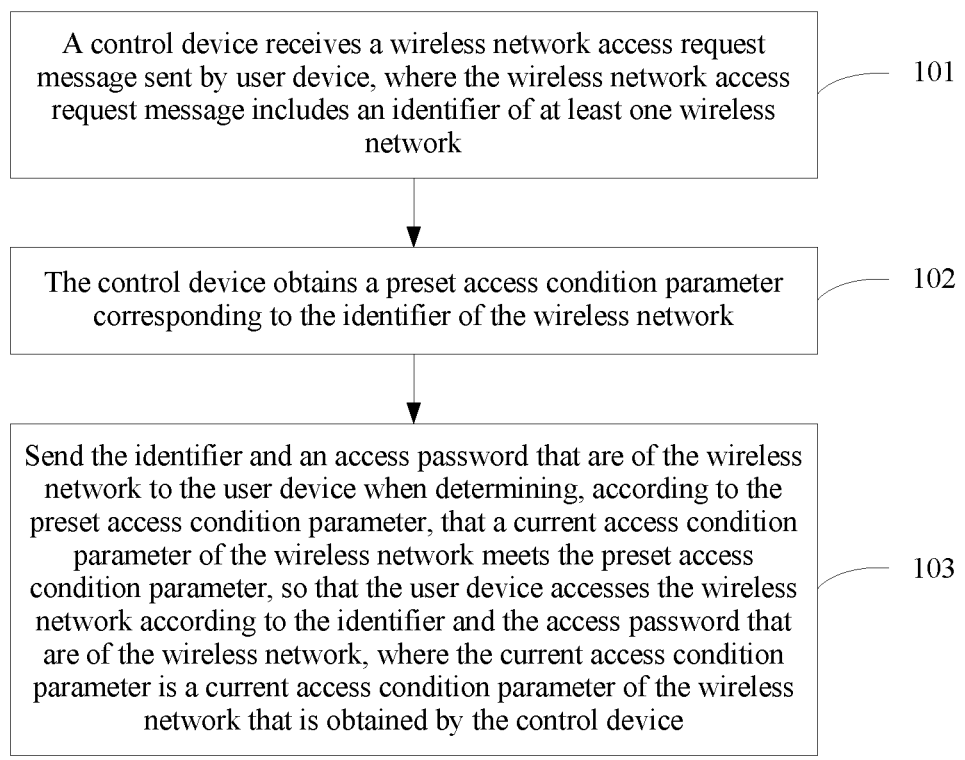
FIG. 1 is a schematic flowchart of a wireless network access control method according to an embodiment of the present invention.

FIG. 1 is a schematic flowchart of a wireless network access control method according to an embodiment of the present invention. As shown in FIG. 1, the wireless network access control method in this embodiment may include the following steps.

101. A control device receives a wireless network access request message sent by user device, where the wireless network access request message includes an identifier of at least one wireless network.

When the user device needs to access a wireless network, the user device may search for a nearby wireless network, and send an identifier of a found wireless network to the control device. The identifier of the wireless network may be carried in a wireless network access request message and sent to the control device. Specifically, the control device may receive, for example, by using a mobile network or an SMS message channel, the wireless network access request message sent by the user device. The identifier of the wireless network is, for example, a service set identifier (Service Set Identifier, SSID for short) of the wireless network.

102. The control device obtains a preset access condition parameter corresponding to the identifier of the wireless network.

In another implementation manner of the present invention, before step 102, the method may include:

receiving, by the control device, the preset access condition parameter of the wireless network that is sent by a setting device; and saving, by the control device, the preset access condition parameter of the wireless network in a control policy parameter list corresponding to the identifier of the wireless network.

Specifically, an owner of the wireless network may set the preset access condition parameter of the wireless network of the owner by using the setting device.

It should be noted that, the user device needs to access a wireless network to implement a network application service by using the wireless network, and needs to access the wireless network by using an access device of the wireless network, where the access device is, for example, a device such as a gateway device or a router. Therefore, the foregoing owner of the wireless network is a representation and represents an owner of an access device of the wireless network, for example, an owner of the foregoing gateway device or an owner of the foregoing router.

In this embodiment, the owner of the wireless network sets, by using the setting device, the preset access condition parameter required for accessing the wireless network on the access device corresponding to the wireless network. The preset access condition parameter of the wireless network is set on the access device corresponding to the wireless network, so that the preset access condition parameter takes effect on the access device, and when the user device subsequently needs to access the wireless network corresponding to the access device, access control processing is performed, by using the preset access condition parameter, for whether the user device can access the wireless network.

In this embodiment of the present invention, the setting device and the access device may be disposed separately, or may be integrated, and the setting device is mainly configured to implement setting of a control policy parameter on the corresponding access device.

In this embodiment of the present invention, the preset access condition parameter may include at least one or any combination of the following parameters: an identifier of user device allowed to access the wireless network, a largest quantity of user device allowed to access the wireless network, longest duration allowed for access to the wireless network, or traffic or bandwidth allowed for access to the wireless network. The preset access condition parameter includes but is not limited to the parameters listed above.

That the owner of the wireless network sets, by using the setting device, the preset access condition parameter required for accessing the wireless network on the access device corresponding to the wireless network may be implemented in the following manner:

sending, by the setting device, the preset access condition parameter of the wireless network to the access device of the wireless network, so that the access device saves the preset access condition parameter to make the preset access condition parameter take effect.

In addition, the setting device not only sends the foregoing preset access condition parameter to the access device, but also sends the preset access condition parameter of the wireless network to the control device, so that the control device saves the preset access condition parameter of the wireless network in the control policy parameter list corresponding to the identifier of the wireless network.

It should be noted that, if modifying the preset access condition parameter of the wireless network again, the setting device needs to send a modified preset access condition parameter of the wireless network to the access device and the control device, so that the access device and the control device update the preset access condition parameter of the wireless network.

In another embodiment of the present invention, step 102 may specifically include:

querying, by the control device according to the identifier of the wireless network that is included in the wireless network access request message, the control policy parameter list corresponding to the identifier of the wireless network, to obtain the preset access condition parameter corresponding to the identifier of the wireless network.

For savage of preset access condition parameters of different wireless networks, the control device establishes corresponding lists according to identifiers of the different wireless networks, and saves the preset access condition parameters corresponding to the identifiers of the different wireless networks in the corresponding lists. Therefore, after receiving the wireless network access request message sent by the user device, the control device queries, according to the identifier of the wireless network in the request message, the list corresponding to the identifier of the wireless network, to obtain the preset access condition parameter corresponding to the identifier of the wireless network.

103. The control device sends the identifier and an access password that are of the wireless network to the user device when determining, according to the preset access condition parameter, that a current access condition parameter of the wireless network meets the preset access condition parameter, so that the user device accesses the wireless network according to the identifier and the access password that are of the wireless network, where the current access condition parameter is a current access condition parameter of the wireless network that is obtained by the control device.

Specifically, at the same time when saving the foregoing preset access condition parameter of the wireless network in the control policy parameter list corresponding to the identifier of the wireless network, the control device may also save a correspondence between the identifier of the wireless network, the access password required for accessing the wireless network, and the preset access condition parameter of the wireless network. Therefore, when determining that the current access condition parameter of the wireless network meets the preset access condition parameter of the wireless network, the control device obtains, according to the foregoing correspondence, the access password and the identifier that are of the wireless network, and sends the identifier and the access password that are of the wireless network to the user device that sends the access request message. In this way, the user device may determine the to-be-accessed wireless network according to the received identifier of the wireless network, and access the wireless network by using the received access password of the wireless network.

In step 103, the control device determines whether the current access condition parameter of the wireless network meets the preset access condition parameter. For example, a preset access condition parameter of the wireless network N is an identifier of user device allowed to access the wireless network N. When the control device obtains the preset access condition parameter of the wireless network N according to an identifier of the wireless network N that is carried in an access request message sent by user device A, and the preset access condition parameter is the identifier of the user device allowed to access the wireless network N, where for example, user devices whose identifiers are A, B, and C are allowed to access the wireless network N, in this case, the control device first obtains a current access condition parameter of the wireless network N. In this example, the current access condition parameter of the wireless network N is, for example, an identifier of user device that currently has accessed the wireless network N. For example, user devices that currently have accessed the wireless network N are the user device B and the user device C. Then, the control device determines that the user device A that sends a request is not included in the user devices that currently have accessed the wireless network N, and the user device A is included in the identifiers of the user devices allowed to access the wireless network N, so that the control device determines that the current access condition parameter of the wireless network N meets the preset access condition parameter of the wireless network N. On the contrary, if the user device A is included in the user devices that currently have accessed the wireless network N, or the user device A is not included in the identifiers of the user devices allowed to access the wireless network N, the control device determines that the current access condition parameter of the wireless network N does not meet the preset access condition parameter of the wireless network N.

For another example, a preset access condition parameter of the wireless network N is a largest quantity of user device allowed to access the wireless network N; for example, an upper limit of the quantity of user device allowed for access is five. In this case, a current access condition parameter of the wireless network N is a quantity of user device that has accessed the wireless network N, for example, three user devices have accessed the wireless network N. Therefore, if the quantity of user device that currently has accessed the wireless network N (that is, the current access condition parameter) is less than the largest quantity of user device allowed to access the wireless network N (that is, the preset access condition parameter), the control device determines that the current access condition parameter of the wireless network N meets the preset access condition parameter of the wireless network N. On the contrary, if the quantity of user device that currently has accessed the wireless network N is greater than or equal to the largest quantity of user device allowed to access the wireless network N, it is determined that the current access condition parameter of the wireless network N does not meet the preset access condition parameter of the wireless network N.

For still another example, a preset access condition parameter of the wireless network N includes traffic or bandwidth allowed for access to the wireless network N. Traffic is used as an example; for example, 100 MB traffic is allocated to each user device. In this case, a current access condition parameter of the wireless network N indicates a volume of traffic already used by each user device. It should be noted that, if user device has never accessed the wireless network N, in the current access condition parameter of the wireless network N, a volume of traffic already used by the user device is 0 for the user device. Therefore, if a volume of traffic already used by user device A that currently sends an access request message (that is, the current access condition parameter) is less than a largest volume of traffic that the wireless network N allows or allocates to the user device A to use (that is, the preset access condition parameter), the control device determines that the current access condition parameter of the wireless network N meets the preset access condition parameter of the wireless network N. On the contrary, if a volume of traffic already used by user device A is greater than or equal to a largest volume of traffic that the wireless network N allows or allocates to the user device A to use, it is determined that the current access condition parameter of the wireless network N does not meet the preset access condition parameter of the wireless network N.

For yet another example, a preset access condition parameter of the wireless network N includes longest duration allowed for access to the wireless network N. For example, longest usage duration of 10 hours is allocated to each user device. In this case, a current access condition parameter of the wireless network N indicates duration already used by each user device. It should be noted that, if user device has never accessed the wireless network N, in the current access condition parameter of the wireless network N, duration already used by the user device is 0 for the user device. Therefore, if duration already used by user device A that currently sends an access request message (that is, the current access condition parameter) is less than the longest duration that the wireless network N allows the user device A to use (that is, the preset access condition parameter), the control device determines that the current access condition parameter of the wireless network N meets the preset access condition parameter of the wireless network N. On the contrary, if duration already used by user device A is greater than or equal to the longest duration that the wireless network N allows the user device A to use, it is determined that the current access condition parameter of the wireless network N does not meet the preset access condition parameter of the wireless network N.

Then, when determining that the foregoing current access condition parameter of the wireless network meets the preset access condition parameter of the wireless network, the control device obtains, from the control policy parameter list corresponding to the identifier of the wireless network, the identifier and the access password that are of the wireless network, and sends the identifier and the access password to the user device that sends the access request message, so that the user device accesses the wireless network according to the identifier and the access password that are of the wireless network.

In this embodiment, the current access condition parameter of the wireless network is a current access condition parameter of the wireless network that is obtained by the control device, where the current access condition parameter may be sent to the control device by the access device corresponding to the wireless network. Specifically, an access device corresponding to each wireless network may learn, by means of real-time or periodic detection, an access status of the wireless network corresponding to the access device, that is, a current access condition parameter of the wireless network, for example, a quantity of connected user device or duration already used by each connected user device, and send the detected current access condition parameter to the control device, so that the control device can learn the current access status of each wireless network.

It should be noted that, in this embodiment, a wireless network access request message sent by user device to a control device includes an identifier of at least one wireless network. In a case in which the request message includes an identifier of only one wireless network, when determining that a current access condition parameter of the wireless network meets a preset access condition parameter of the wireless network, the control device may send only an access password of the wireless network to the user device that sends the request message, so that the user device accesses the wireless network according to access password of the wireless network; or may send the identifier and an access password that are of the wireless network to the user device that sends the request message, so that the user device can know the to-be-accessed wireless network, and access the wireless network according to the access password of the wireless network. In a case in which the request message includes identifiers of multiple wireless networks, for example, two wireless networks, if current access condition parameters of the multiple wireless networks respectively meet preset access condition parameters of the multiple wireless networks, the control device sends the identifiers and access passwords that are of the multiple wireless networks to the user device that sends the request message. During specific implementation, the control device may separately send, according to load statuses that are of the multiple wireless networks and are represented by the current access condition parameters of the multiple wireless networks, the identifiers and the access passwords respectively corresponding to the multiple wireless networks to the user device in ascending order of load, so that the user device can selectively and preferably access a wireless network with lower load. It should be noted that, the foregoing preset access condition parameter of the wireless network may further include a sharing status of the wireless network, where the sharing status of the wireless network includes sharing enablement or sharing disablement. when an owner of the wireless network enables sharing of the wireless network, that is, when the sharing status in the preset access condition parameter indicates sharing enablement, the control device determines whether the current access condition parameter of the wireless network meets a requirement of another parameter, except the sharing status, in the preset access condition parameter of the wireless network.

In another embodiment of the present invention, after the user device accesses the wireless network according to the received identifier and the received access password that are of the wireless network, the user device may further send, to the control device according to status information of usage of the wireless network, a status parameter of connection to the wireless network by the user device.

Therefore, the control device sends a disconnection request message to the access device of the wireless network when determining, according to the status parameter of connection to the wireless network that is sent by the user device, that the status parameter of connection to the wireless network by the user device does not meet the preset access condition parameter of the wireless network, where the disconnection request message includes an identifier of the user device, so that the access device disconnects the user device from the wireless network according to the identifier of the user device that is included in the disconnection request message.

The status parameter may include duration of access to the wireless network by the user device or traffic of connection to the wireless network, and the status parameter includes but is not limited to the foregoing parameter information.

It should be noted that, the foregoing preset access condition parameter of the wireless network may include a parameter that represents a usage status of the wireless network, for example, the foregoing longest duration allowed for access to the wireless network or the foregoing traffic or bandwidth allowed for access to the wireless network, and may further include a parameter that represents a load status of the wireless network, for example, the foregoing identifier of the user device allowed to access the wireless network or the foregoing largest quantity of user device allowed to access the wireless network. In this embodiment, when the preset condition parameter of the wireless network includes the foregoing parameter that represents the usage state, after the user device accesses the wireless network, the user device may further send, to the control device according to the status information of usage of the wireless network by the user device, the status parameter of connection to the wireless network by the user device.

In this embodiment of the present invention, a control device receives a wireless network access request message that is sent by user device and that carries an identifier of at least one wireless network, and determines, according to the identifier of the wireless network, a control policy parameter corresponding to the identifier of the wireless network. Because the control policy parameter includes a preset access condition parameter, the control device sends the control policy parameter of the wireless network to the user device when determining that a current access condition parameter of the wireless network to be accessed by the user device meets the preset access condition parameter, so that the user device accesses the wireless network according to the identifier and an access password that are of the wireless network and that are in the control policy parameter. A control policy parameter for accessing a wireless network is properly set, so that wireless network access can be controlled flexibly. This not only avoids a waste of wireless network resources, but also does not affect wireless network access quality.

Figure 2:
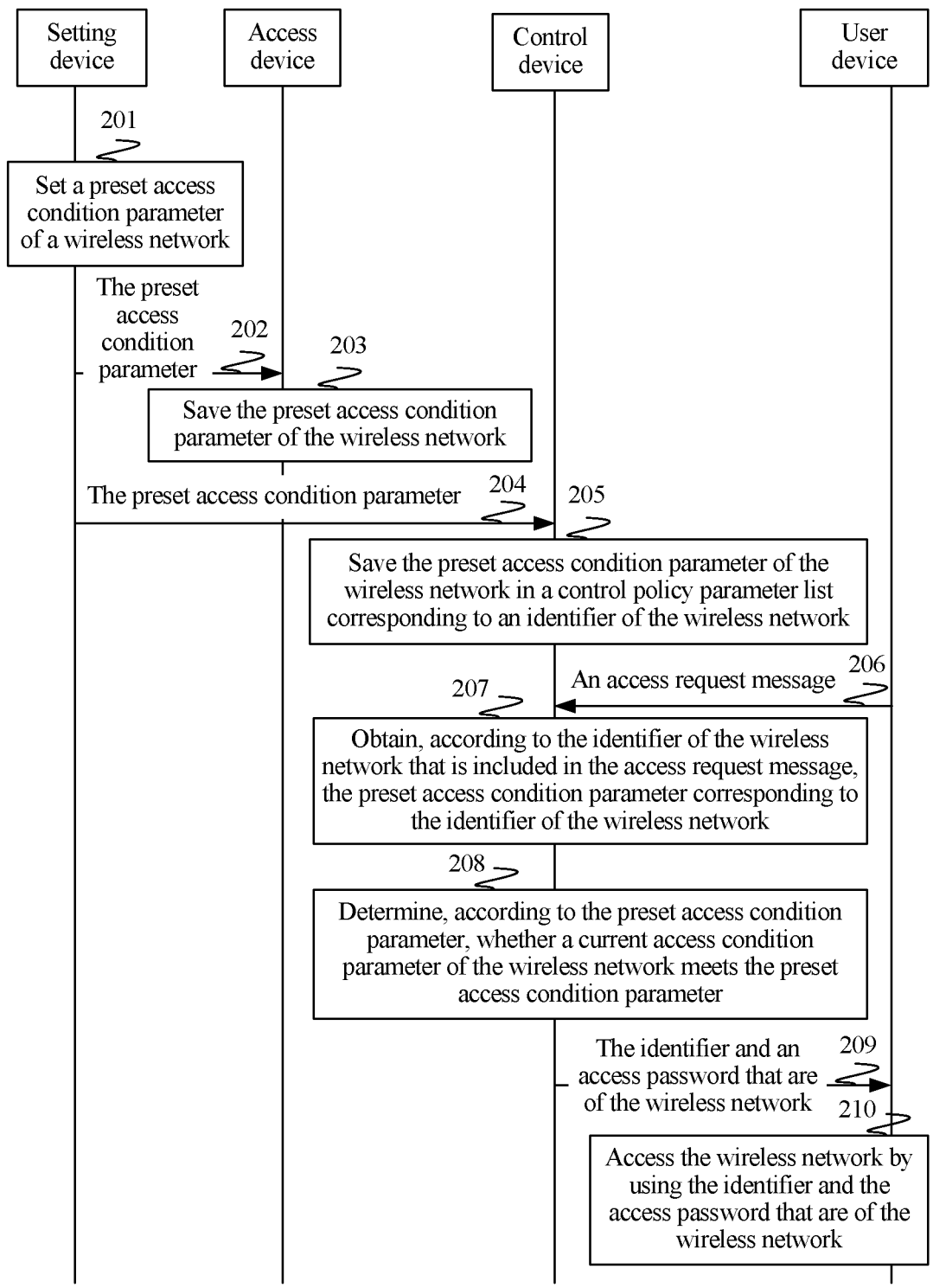
FIG. 2 is a signaling diagram of a wireless network access control method according to another embodiment of the present invention.

FIG. 2 is a signaling diagram of a wireless network access control method according to another embodiment of the present invention. As shown in FIG. 2, the wireless network access control method involves the following devices: user device, an access device, a setting device, and a control device. The user device is, for example, a mobile phone or a tablet computer. When a user corresponding to the user device needs to access a wireless network such as a WiFi network to perform a network service, the user needs to use the access device to access the corresponding wireless network. The setting device and the access device may be integrated or disposed separately, and the setting device is mainly used by an owner of each wireless network, that is, an owner of an access device corresponding to each wireless network sets a control policy parameter of the wireless network of the owner by using a setting device corresponding to the access device. The control device is mainly configured to: when the user device needs to access a wireless network corresponding to an access device, perform, by using a control policy parameter of the wireless network, control processing for whether the user device can access the wireless network. The wireless network access control method provided in this embodiment includes the following steps.

201. The setting device sets a preset access condition parameter of a wireless network.

202. The setting device sends the preset access condition parameter of the wireless network to the access device of the wireless network.

203. The access device saves the preset access condition parameter of the wireless network.

The access device may be but is not limited to a device such as a wireless router or a switch.

204. The setting device sends the preset access condition parameter of the wireless network to the control device.

205. The control device saves the preset access condition parameter of the wireless network in a control policy parameter list corresponding to an identifier of the wireless network.

206. The user device sends an access request message to the control device.

The access request message includes an identifier of a nearby wireless network found by the user device. Assuming that identifiers of multiple wireless networks are found nearby, the identifiers of the multiple wireless networks may all be sent to the control device. In another embodiment of the present invention, when finding the identifiers of the multiple wireless networks, the user device may sort the found wireless networks according to signal strength of the found wireless networks. Therefore, identifiers of multiple wireless networks that are included in the access request message are identifiers of a preset quantity of wireless networks whose signal strength ranks higher and that are obtained after the user device sorts the found wireless networks.

Specifically, the access request message may be sent to the control device by using a channel such as a voice channel or an SMS message channel, etc. In an SMS message channel scenario, the control device needs a corresponding SMS message access number, and the user device uses the access request message as SMS message content, and sends the SMS message content to the control device corresponding to the SMS message access number.

207. The control device obtains, according to the identifier of the wireless network that is included in the access request message, the preset access condition parameter corresponding to the identifier of the wireless network.

208. The control device determines, according to the preset access condition parameter, whether a current access condition parameter of the wireless network meets the preset access condition parameter.

209. When the current access condition parameter of the wireless network meets the preset access condition parameter, the control device sends the identifier and an access password that are of the wireless network to the user device.

Specifically, when the control device obtains, according to the identifier of the wireless network that is included in the access request message, the preset access condition parameter corresponding to the identifier of the wireless network, if the user device uploads identifiers of multiple wireless networks, the control device may determine, according to a preset rule, a wireless network whose identifier and access password are to be preferably returned. For example, a upper limit allowed to access a wireless network A are five user devices, and also, upper limit allowed to access a wireless network B are five user devices. When five user devices currently have accessed the wireless network A, and also, five user devices currently have accessed the wireless network B, identifiers and access passwords that are of the wireless network A and the wireless network B are not returned. For another example, when a quantity of user device that currently has accessed the wireless network A is less than five, for example, one user device, and a quantity of user device that currently has accessed the wireless network B is less than five, for example, three user devices, if the preset rule is to return an identifier and an access password that are of only one available wireless network to the user device, an identifier and an access password that are of the wireless network A are preferably sent to the user device according to access load of the wireless network A and the wireless network B.

Specifically, the control device may send the identifier and the access password that are of the wireless network A to the user device by using a channel such as a voice channel or an SMS message channel, etc.

210. The user device accesses the wireless network by using the identifier and the access password that are of the wireless network.

It is assumed that when the preset access condition parameter of the wireless network includes traffic and duration allowed for access to the wireless network, the control device needs to monitor traffic and duration of access to the wireless network by the user device. For example, if longest usage duration of one time connection to the wireless network is one hour, when duration of access to the wireless network by the user device reaches one hour, the control device may send the access device of the wireless network, for example, a request for breaking wireless connection of the user device, and the access device breaks the wireless connection of the user device when receiving the request for breaking the wireless connection of the user device. In this case, the user device needs to obtain the identifier and the access password that are of the wireless network again from the control device to perform access again.

Alternatively, the user device regularly updates a status parameter of connection to the wireless network. For example, the user device sends, to the control device, the status parameter such as duration and traffic of connection to the wireless network by the user device, so that the control device performs effective control and determining on access of the user device to the wireless network.

It should be noted that, when an owner of the wireless network modifies, by using the setting device, the preset access condition parameter of the wireless network, for example, modifies a quantity of connected user device, bandwidth, or longest access duration, the setting device needs to save a modified preset access condition parameter of the wireless network on the access device of the wireless network and the control device.

After the owner of the wireless network modifies the preset access condition parameter of the wireless network by using the setting device, the user device probably cannot access the wireless network. In this case, the user device needs to perform the foregoing steps 206 to 209 again and execute a wireless network access procedure again.

In this embodiment of the present invention, when receiving an access request message sent by user device, a control device may select an identifier and an access password that are of an optimal wireless network according to a preset access condition parameter that is of a wireless network and that is set by an owner of the wireless network, and send the identifier and the access password to the user device, so that the user device accesses the wireless network according to the identifier and the access password that are of the optimal wireless network, and wireless network access can be controlled flexibly. This not only avoids a waste of wireless network resources, but also does not affect wireless network access quality.

Figure 3:
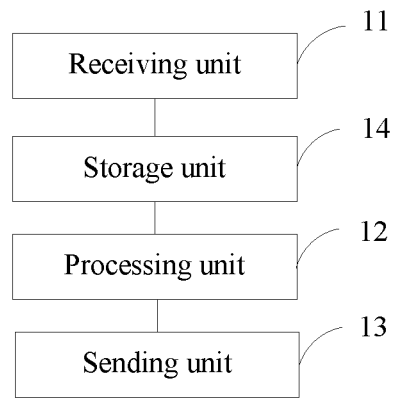
FIG. 3 is a schematic structural diagram of a wireless network access control device according to an embodiment of the present invention.

FIG. 3 is a schematic structural diagram of a wireless network access control device according to an embodiment of the present invention. As shown in FIG. 3, the control device includes:

a receiving unit 11, configured to receive a wireless network access request message sent by user device, where the wireless network access request message includes an identifier of at least one wireless network;

a processing unit 12, configured to obtain a preset access condition parameter corresponding to the identifier of the wireless network; where the processing unit 12 is further configured to: when determining, according to the preset access condition parameter, that a current access condition parameter of the wireless network meets the preset access condition parameter, instruct a sending unit 13 to send the identifier and an access password that are of the wireless network to the user device; and the sending unit 13, configured to send the identifier and the access password that are of the wireless network to the user device, so that the user device accesses the wireless network according to the identifier and the access password that are of the wireless network, where the current access condition parameter is a current access condition parameter of the wireless network that is obtained by the control device.

It should be noted that, if the processing unit 12 determines that the current access condition parameter of the wireless network cannot meet the preset access condition parameter, the procedure of accessing the wireless network by the user device ends.

The receiving unit 11 is further configured to:
receive the preset access condition parameter of the wireless network that is sent by a setting device.

The device further includes:
a savage unit 14, configured to save the preset access condition parameter of the wireless network in a control policy parameter list corresponding to the identifier of the wireless network. The processing unit 12 is specifically configured to query, according to the identifier of the wireless network in the wireless network access request message, the control policy parameter list corresponding to the identifier of the wireless network, to obtain the preset access condition parameter corresponding to the identifier of the wireless network.

The receiving unit 11 is further configured to:
receive a status parameter of connection to the wireless network that is sent by the user device.

The processing unit 12 is further configured to: when determining that the status parameter does not meet the preset access condition parameter of the wireless network, instruct the sending unit 13 to send a disconnection request to an access device of the wireless network.

The sending unit 13 is further configured to send the disconnection request message to the access device of the wireless network, where the disconnection request message includes an identifier of the user device, so that the access device disconnects the user device from the wireless network according to the identifier of the user device in the disconnection request message.

It should be noted that the receiving unit 11 may receive, by using a voice channel or an SMS message channel, the wireless network access request message sent by the user device.

The sending unit 13 may send the identifier and the access password that are of the wireless network to the user device by using a voice channel or an SMS message channel.

The preset access condition parameter includes at least one or any combination of the following parameters: an identifier of user device allowed to access the wireless network, a largest quantity of user device allowed to access the wireless network, longest duration allowed for access to the wireless network, or traffic or bandwidth allowed for access to the wireless network.

The control device in this embodiment may be configured to execute the technical solutions in the method embodiment shown in FIG. 1 or FIG. 2, and an implementation principle and a technical effect of the control device are similar to those of the method embodiment. Details are not described herein again.

Figure 4:
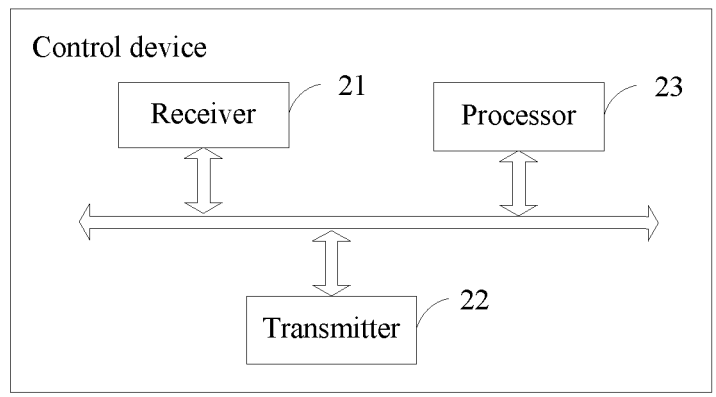
FIG. 4 is a schematic structural diagram of a wireless network access control device according to another embodiment of the present invention.

FIG. 4 is a schematic structural diagram of a wireless network access control device according to another embodiment of the present invention. As shown in FIG. 4, the control device includes:

a receiver 21, a transmitter 22, and a processor 23 connected to the receiver 21 and the transmitter 22 by using a bus. The receiver 21 is configured to receive a wireless network access request message sent by user device, where the wireless network access request message includes an identifier of at least one wireless network;

the processor 23 is configured to execute the following in the wireless network access control method described in FIG. 1 or FIG. 2: obtaining a preset access condition parameter corresponding to the identifier of the wireless network, and when determining, according to the preset access condition parameter, that a current access condition parameter of the wireless network meets the preset access condition parameter, instructing the transmitter 22 to send the identifier and an access password that are of the wireless network to the user device; and the transmitter 22 is configured to send the identifier and the access password that are of the wireless network to the user device, so that the user device accesses the wireless network according to the identifier and the access password that are of the wireless network, where the current access condition parameter is a current access condition parameter of the wireless network that is obtained by the control device.

The receiver 21 is further configured to receive the preset access condition parameter of the wireless network that is sent by a setting device.

The processor 23 is further configured to save the preset access condition parameter of the wireless network in a control policy parameter list corresponding to the identifier of the wireless network.

The access condition parameter includes at least one or any combination of the following parameters: an identifier of user device allowed to access the wireless network, a largest quantity of user device allowed to access the wireless network, longest duration allowed for access to the wireless network, or traffic or bandwidth allowed for access to the wireless network.

The processor 23 is further configured to query, according to the identifier of the wireless network in the wireless network access request message, the control policy parameter list corresponding to the identifier of the wireless network, to obtain the preset access condition parameter corresponding to the identifier of the wireless network.

The receiver 21 is further configured to receive a status parameter of connection to the wireless network that is sent by the user device.

The processor 23 is further configured to: when determining that the status parameter does not meet the preset access condition parameter of the wireless network, instruct the transmitter 22 to send a disconnection request to an access device of the wireless network.

The transmitter 22 is further configured to send the disconnection request message to the access device of the wireless network, where the disconnection request message includes an identifier of the user device, so that the access device disconnects the user device from the wireless network according to the identifier of the user device in the disconnection request message.

The receiver 21 is further configured to receive, by using a voice channel or an SMS message channel, the wireless network access request message sent by the user device.

Correspondingly, the transmitter 22 is further configured to send the identifier and the access password that are of the wireless network to the user device by using a voice channel or an SMS message channel.

The control device in this embodiment may be configured to execute the technical solutions in the method embodiment shown in FIG. 1 or FIG. 2, and an implementation principle and a technical effect of the control device are similar to those of the method embodiment. Details are not described herein again.

Figure 5:
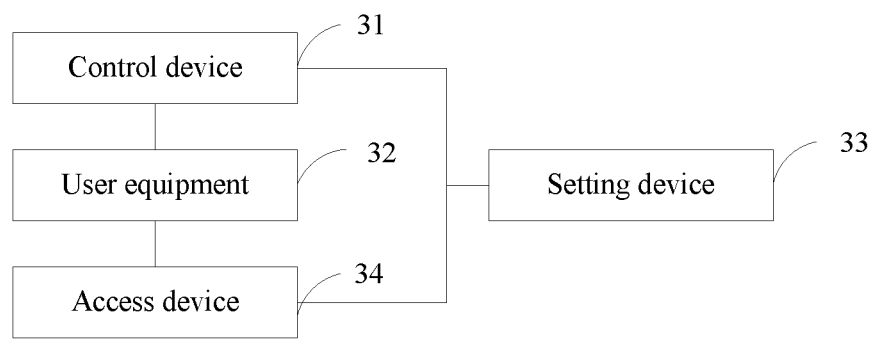
FIG. 5 is a schematic structural diagram of a wireless network access control system according to an embodiment of the present invention.

FIG. 5 is a schematic structural diagram of a wireless network access control system according to an embodiment of the present invention. As shown in FIG. 5, the system includes:

a control device 31 and user device 32.

The control device 31 includes the wireless network access control device described in FIG. 3 or FIG. 4.

The user device 32 is configured to send a wireless network access request message to the control device 31, where the wireless network access request message includes an identifier of at least one wireless network, so that the control device 31 obtains a preset access condition parameter corresponding to the identifier of the wireless network, and sends the identifier and an access password that are of the wireless network to the user device when determining that a current access condition parameter of the wireless network meets the preset access condition parameter, where the current access condition parameter is a current access condition parameter of the wireless network that is obtained by the control device.

The user device 32 is further configured to access the wireless network according to the identifier and the access password that are of the wireless network and are sent by the control device 31.

The system further includes:

a setting device 33, configured to set the preset access condition parameter of the wireless network, where the setting device 33 is further configured to send the preset access condition parameter of the wireless network to an access device 34 of the wireless network, so that the access device 34 saves the preset access condition parameter.

The setting device 33 is further configured to send the preset access condition parameter of the wireless network to the control device 31, so that the control device 31 saves the preset access condition parameter of the wireless network in a control policy parameter list corresponding to the identifier of the wireless network.

The user device 32 is further configured to send, to the control device 31, a status parameter of connection to the wireless network by the user device 32, so that the control device 31 sends a disconnection request message to the access device 34 of the wireless network when determining that the status parameter does not meet the preset access condition parameter of the wireless network, where the disconnection request message includes an identifier of the user device 32.

The access device 34 is further configured to disconnect the user device 32 from the wireless network according to the identifier of the user device 32 in the disconnection request message.

The preset access condition parameter includes at least one or any combination of the following parameters: an identifier of user device allowed to access the wireless network, a largest quantity of user device allowed to access the wireless network, longest duration allowed for access to the wireless network, or traffic or bandwidth allowed for access to the wireless network.

It may be clearly understood by persons skilled in the art that, for the purpose of convenient and brief description, for a detailed working process of the foregoing system and device, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present invention.

What is claimed is:

1. A method comprising:
obtaining, by a wireless network access control device, a preset access condition parameter of a wireless network of the wireless network access control device, the preset access condition parameter comprising identifiers of one or more devices allowed to access the wireless network;
enabling, by the wireless network access control device, the wireless network to be found;
receiving, by the wireless network access control device, an access request message for the wireless network from a first terminal;
determining, by the wireless network access control device, that the first terminal should be allowed access to the wireless network based on the preset access condition parameter and, in response, allowing, by the wireless network access control device, the first terminal to access the wireless network.

2. The method of claim 1, wherein the access request message comprises an identifier of the first terminal.

3. The method of claim 2, wherein determining, by the wireless network access control device, that the first terminal should be allowed to access the wireless network comprises determining, by the wireless network access control device, that the identifier of the preset access condition parameter matches the identifier of the access request message.

4. The method of claim 1, wherein allowing, by the wireless network access control device, the first terminal to access the wireless network further comprises:

setting, by the wireless network access control device, a sharing status of the wireless network; and after setting the sharing status of the wireless network, allowing, by the wireless network access control device, the first terminal to access the wireless network.

5. The method of claim 1, further comprising:

associating, by the wireless network access control device, the preset access condition parameter of the wireless network with an identifier of the wireless network; and saving, by the wireless network access control device, the preset access condition parameter of the wireless network in a control policy parameter list associated with the identifier of the wireless network.

6. The method of claim 1, wherein the wireless network is a Wi-Fi network.

7. The method of claim 1, wherein the method further comprises:

receiving, by the wireless network access control device, a second access request message sent by a second terminal;

determining, by the wireless network access control device, that the second terminal should not be allowed to access the wireless network according to the preset access condition parameter, and in response, not allowing, by the wireless network access control device, the second terminal to access the wireless network.

8. A wireless network access control device, comprising a receiver, a transmitter, and a processor, where the receiver, the transmitter, and the processor are connected to each other by using a bus, wherein:

the processor is configured to execute the following steps:

obtaining a preset access condition parameter of a wireless network of the wireless network access control device, the preset access condition parameter comprising identifiers of one or more devices allowed to access the wireless network;

enabling the wireless network to be found;

receiving an access request message for the wireless network from a first terminal;

determining whether the first terminal should be allowed access to the wireless network based on the preset access condition parameter and, in response to determining that the first terminal should be allowed to access the wireless network, allowing the first terminal to access the wireless network.

9. The wireless network access control device according to claim 8, wherein the access request message comprises an identifier of the first terminal.

10. The wireless network access control device according to claim 9, wherein determining that the first terminal should be avowed to access the wireless network comprises determining that the identifier of the preset access condition parameter matches the identifier of the access request message.

11. The wireless network access control device according to claim 8, wherein allowing the first terminal to access the wireless network further comprises:

setting a sharing status of the wireless network; and after setting the sharing status of the wireless network, allowing the first terminal to access the wireless network.

12. The wireless network access control device according to claim 8, wherein the processor is configured to execute the following steps:

associating the preset access condition parameter of the wireless network with an identifier of the wireless network; and saving the preset access condition parameter of the wireless network in a control policy parameter list associated with the identifier of the wireless network.

13. The wireless network access control device according to claim 8, wherein the wireless network is a Wi-Fi network.

14. The wireless network access control device according to claim 8, wherein the processor is configured to execute the following step:

in response to determining that the first terminal should not be allowed to access the wireless network according to the preset access condition parameter, not allowing the second terminal to access the wireless network.

* * * * *